Oct. 7, 1930.  W. H. ENGLEBRIGHT  1,777,608

VALVE

Filed May 12, 1928

Inventor
William H. Englebright

By Clarence A. O'Brien
Attorney

Patented Oct. 7, 1930

1,777,608

UNITED STATES PATENT OFFICE

WILLIAM HENRY ENGLEBRIGHT, OF BERWYN, ILLINOIS

VALVE

Application filed May 12, 1928. Serial No. 277,210.

The present invention covers an improved valve for general use, and it has more particular reference to a valve which is especially practicable for domestic use to take the place of water spigots and the like, such as are found in the water system of the present day home.

More specifically speaking, the invention has reference to a valve which includes a casing having a discharge spout, connections for hot and cold water, and a rotary handle actuated plug within the casing for controlling the supply of either hot or cold water from the spout.

The invention is regarded as a mechanical achievement which is, comparatively speaking, more efficient than the common type of spigot in that it includes a single control plug, and other structural features which are not likely to get out of order, and which require a minimum amount of attention.

The principal feature of the invention is a rotary tapered plug fitting snugly within the outer casing and held in place by an adjustable bonnet or cap which is capable of being regulated to compensate for wear, this arrangement making it possible to eliminate gaskets, stuffing boxes, and similar packing elements.

Other features and advantages of the invention will become more readily apparent from the following description and drawings.

In the drawings:—

Figure 1:
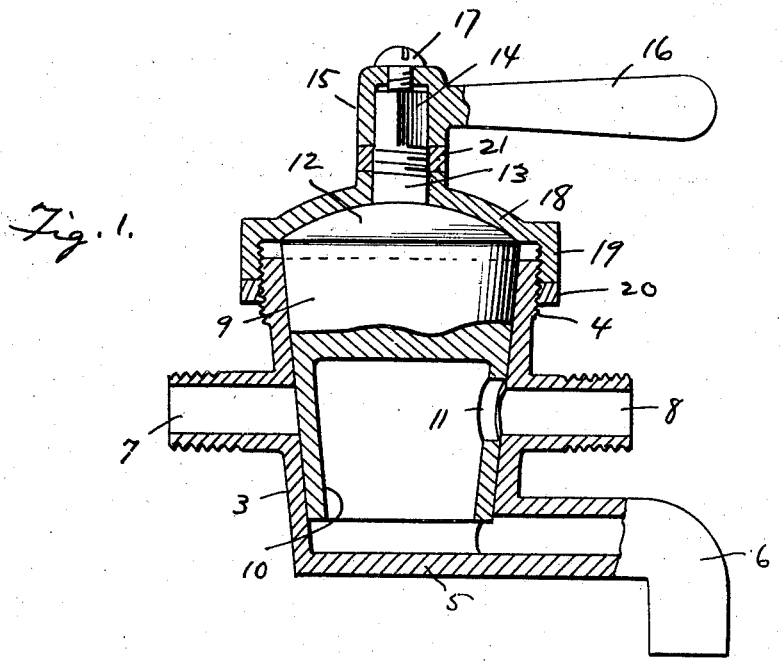
Figure 1 is a view in section and elevation of an improved valve constructed in accordance with the present invention.
Figure 2:
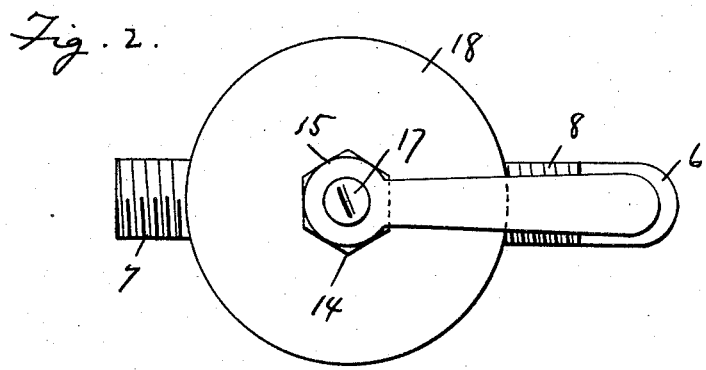
Figure 2 is a top plan view of the same.

Referring now to the drawings by reference characters it will be observed that the casing 3 is of substantially tapered configuration, the same being open at its top, formed with external screw threads 4 at its top and having a flat bottom 5 provided with an integral spigot or spout 6 of suitable configuration.

At diametrically opposite sides the casing 3 is provided with screw threaded attaching nipples for connections 7 and 8 for hot and cold water pipes, respectively. Located within the casing is a tapered rotary plug valve 9 having a socketed lower portion 10 provided with a discharge port 11 capable of registry with either of the connections 7 or 8. The upper end of the plug is convex in form, as represented at 12 and is provided with a central upstanding projection 13 screw threaded between its ends and having its upper end of flat faced form as at 14. Fitted over the portion 14 is a cup like connection 15 carried by the inner end of the operating handle 16. This is held in place by a retaining screw 17 threaded into a socket in the stem 13. The bonnet or cap 18 includes a central upstanding neck embracing the stem and a depending peripheral rim 19 internally screw threaded and connected with the threads 4 on the casing. Cooperable with this rim and the thread is a lock nut 20. If desired, a nut or the like 21 may be interposed between the cap and cup 15 as shown in Figure 1.

A further analysis of the structure is regarded unnecessary inasmuch as it is quite plain that the plug is simply rotated to bring about registration of the discharge port 11 with either of the pipe connections 7 and 8, thus allowing hot or cold water to be discharged from the spigot 6. As the plug valve wears, the bonnet may be rotated in the proper direction and locked in place to compensate for wear and to maintain a fluid tight joint at all times. These features and advantages being apparent, a more lengthy description is regarded unnecessary.

Minor changes in shape, size, and rearrangement of parts coming within the field of invention claimed may be resorted to if desired.

Having thus described the invention, what I claim as new is:—

A valve of the class described comprising a casing of tapered form open at its top, having a flat bottom provided with an integral outstanding discharge spout, and intermediate oppositely disposed pipe connections, said casing being externally screw threaded at its top, a tapered plug valve located within the casing and having a socketed bottom portion, the skirt of which has its bottom edges terminating in spaced relation to the bottom of said casing, a single discharge port formed in said skirt and adapted for selective registry with the pipe connections, the upper end portion of the plug valve projecting beyond the upper end of the casing and being of convex form, a correspondingly shaped bonnet fitted down upon said plug valve and having a peripheral screw threaded stem engaging the screw threaded portion of the casing, a lock nut for the bonnet threaded on the upper threaded portion of the casing, said plug valve having a centrally located upstanding stem formed integrally therewith, said stem having a lower cylindrical threaded portion, the upper portion of said stem terminating in a flat faced extension extending through an opening in the bonnet, a handle having a cup on its inner end fitted down over the flattened portion of the stem and connected thereto, and a nut threaded on the threaded cylindrical portion of the stem for interposition between the bonnet and said cup.

In testimony whereof I affix my signature.

WILLIAM H. ENGLEBRIGHT.